//  Patented Dec. 25, 1945

UNITED STATES PATENT OFFICE 2,391,853

PROCESS FOR PRODUCTION OF SULPHANILAMIDE DERIVATIVES

Ferdinand B. Zienty, St. Louis, Mo., assignor to Monsanto Chemical Company, St. Louis, Mo., a corporation of Delaware No Drawing. Application September 10, 1942, Serial No. 457,860

5 Claims. (Cl. 260—239.6)

The present invention relates to processes for the production of dicarboxylic acid derivatives of sulphonamides and refers particularly to processes for the production of $N^4$-succinylsulphathiazole, $N^4$-phthalylsulphathiazole, and similar dicarboxylic acid derivatives of sulphathiazoles.

Heretofore dicarboxylic acid derivatives of sulphathiazole compounds, such as $N^4$-succinylsulphathiazole ($N^4$ - succinyl-$N^1$-2-thiazolyl-sulphanilamide, $N^4$ - succinyl-2-sulphanilylamino-thiazole or $N^4$ - succinyl - 2 - sulfanilamidothiazole), have been produced by the condensation of dicarboxylic acid anhydrides with the respective sulphathiazole derivatives. The reaction, in the case of $N^4$-succinyl-sulphathiazole, may be represented as:

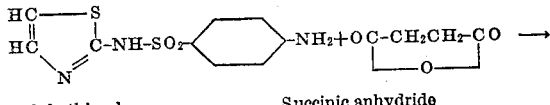

Sulphathiazole        Succinic anhydride

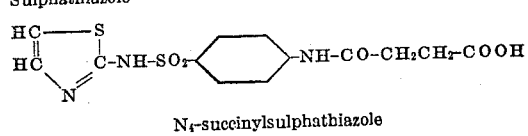

$N^4$-succinylsulphathiazole

These condensations have heretofore been conducted in alcohol solution and in other solvents. In general, the reaction did not proceed to completion, as a result of which the yield was low and the product had to be submitted to difficult purification procedures to eliminate unreacted products. Furthermore, frequently the color was bad and the product was contaminated with by-products of the reaction, which, in the case of $N^4$-succinyl derivatives, include the diamide and the anil derivatives, the formulae of which may be represented generally as:

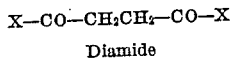

Diamide and

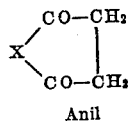

Anil in which X is the residue of the sulphathiazole or other radical.

The principal object of the present invention is to provide an improved method of preparing dicarboxylic acid derivatives of sulphathiazoles. Other objects and advantages of the invention which are not specifically referred to hereinafter will be apparent to those skilled in the art.

I have discovered that when the condensation of the dicarboxylic acid anhydride and a sulphathiazole is conducted in acetone or other ketone, the reaction proceeds substantially to completion, the product is of a light color and is free from substantial amounts of by-products. The dicarboxylic acid derivative is furthermore obtained in a crystalline form which facilitates subsequent purification. The yields obtained in the practice of the process of this invention are close to theoretical.

The process of the invention is applicable to the production of dicarboxylic acid derivatives of sulphathiazoles, which are useful chemotherapeutic agents. It is adaptable to the production of succinic acid, phthalic acid and maleic acid derivatives, and, in general, derivatives of dicarboxylic acids which form anhydrides, although maleic acid derivatives are of less value therapeutically because of certain toxic effects. The sulphathiazole derivatives which are contemplated in the present invention include sulphathiazole itself (2-sulphanilamidothiazole or 2-sulphanilylaminothiazole), 4-alkyl derivatives of sulphathiazole such as 4-methyl and 4-ethylsulphathiazole, and 2 - sulphanilamido-4,5,6,7-tetrahydrobenzothiazole (2 - sulphanilamido-4,5-tetramethylenethiazole), which may be represented by the following formulae:

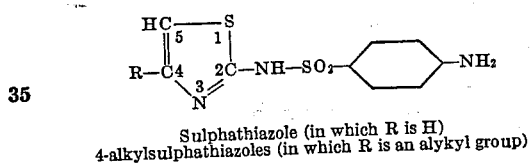

Sulphathiazole (in which R is H)
4-alkylsulphathiazoles (in which R is an alykyl group)

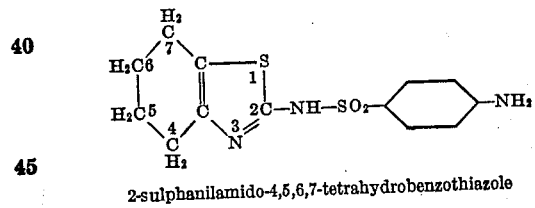

2-sulphanilamido-4,5,6,7-tetrahydrobenzothiazole

The ketones whose use as solvents or reaction media is contemplated in the present invention are normally liquid ketones such as acetone (propanone), methyl ethyl ketone (2-butanone), methyl propyl ketone (2-pentanone), methyl isopropyl ketone (3-methyl-2-butanone), other isomeric pentanones, isomeric hexanones, heptanones and the like. Preferred ketones are those having a low boiling point and preferably those which are water soluble and have high solvent power for the reactants, such as acetone and 2-butanone. Mixtures of such ketones may also be used. It is not necessary that the reactants be completely in solution so the choice of ketone is rather wide. It is sufficient to have enough ketone present in the reaction mixture to provide a mixture of the reactants which is mobile at the reaction temperature, that is, a mixture which can be stirred.

In conducting the condensation according to the process of the present invention, the dicarboxylic acid anhydride and the sulphathiazole derivative are mixed with the ketone, for example, acetone. The proportions of anhydride and sulphathiazole derivative may be those required stoichiometrically for the reaction (equimolecular proportions), although I prefer to use a slight excess of the dicarboxylic acid anhydride, which can be readily removed from the product, in order to drive the reaction to completion. The condensation is then effected by allowing the reaction mixture to stand at room temperature or, preferably, by heating the reaction mixture at about 50 to 60° C. or higher. When acetone is used as the solvent the reaction temperature can be readily controlled by effecting the heating under reflux. When other higher boiling ketones (such as 2-butanone having a boiling point of 79.6° C.) are used, the temperature cannot be maintained at about 50° to 60° C. by reflux. Temperatures higher than 60° C. may be used although, in that event, there is greater danger of discoloration of the product occurring.

Before isolating the product from the reaction mixture, I prefer to add a small amount of water so that, in the case of $N^4$-succinylsulphathiazole, the product is obtained in the form of the crystalline monohydrate. This water may be added at the start of the heating but it is added preferably near the end of the reaction period, as illustrated in Example 1 hereinafter. When added at the beginning of the reaction, water may convert some of the dicarboxylic acid anhydride to the acid and thus retard the condensation reaction. The amount of water which is added is preferably in slight excess of that amount required to form the hydrated salt but a larger excess may be used without substantial detriment. The product may also be recovered in anhydrous form, as illustrated in Example 2 hereinafter, in which event the addition of water is omitted.

Illustrative examples of preferred methods of practicing the process of the invention are as follows:

Example 1

A mixture was made of 25.5 grams of sulphathiazole and 12.5 grams of succinic anhydride (25% excess of amount required stoichiometrically) in 80 cc. acetone. This reaction mixture was heated gently under reflux for one hour. The refluxing temperature was about 55° to 57° C. Then 5 cc. of water was added and the mixture was heated under reflux for 30 minutes longer. The acetone was thereafter distilled off at atmospheric pressure while 95 cc. of water was fed gradually into the distilling mass. The aqueous slurry was cooled to 20° C. and the product was filtered off, washed with water and recrystallized from 40% aqueous alcohol, using decolorizing charcoal.

The yield was 35.2 grams of $N^4$-succinylsulphathiazole, monohydrate, corresponding to 94.4% of the theoretical yield. The product as thus obtained contained less than 0.1% of sulphathiazole and assayed 99.9% pure.

Example 2

To 50 cc. of acetone were added 12.75 grams of sulphathiazole and 5.5 grams of succinic anhydride (present in 10% excess) and the mixture was heated at refluxing temperature for one hour. After allowing the reaction mixture to cool, the product was filtered off, washed with acetone and dried.

The yield of anhydrous $N^4$-succinylsulphathiazole obtained in this manner was 15.8 grams, which corresponds to 89% of the theoretical yield.

Example 3

A mixture consisting of 127.5 grams of sulphathiazole, 92.5 grams of phthalic anhydride (25% excess), and 500 cc. of acetone was heated under gentle reflux for 2 hours. Fifty (50) cc. of water was then added and the slurry was refluxed for an additional ½ hour. Acetone was distilled out and water was fed into the mixture in the still to keep it thin. When the acetone was all removed the aqueous slurry was cooled to room temperature, the product was filtered off, washed with water and dried. The yield of crude anhydrous $N^4$-phthalylsulphathiazole was 199 grams or 99% of the theoretical yield.

The crude product can be purified as follows:

Two hundred one (201) grams of crude $N^4$-phthalylsulphathiazole was dissolved in a mixture of 2400 grams of water and 80 grams of 50% sodium hydroxide solution and treated with 6.25 grams of decolorizing charcoal at 25° to 30° C. The solution was filtered and then a solution of 90 cc. of concentrated hydrochloric acid and 100 cc. of water were fed in with stirring. The precipitated product was filtered off, washed with water and dried. The weight of the purified $N^4$-phthalylsulphathiazole recovered in this manner was 191 grams.

The products obtained according to the present invention may be recovered and purified according to other conventional procedures.

When alcohol is used instead of a ketone as a solvent, the results are typified by the following: A mixture of 12.75 grams of sulphathiazole, 100 grams of absolute ethanol and 6.4 grams of succinic anhydride were heated under reflux for 3 hours. The solution was cooled to room temperature and filtered. A yield of 16.0 grams or 90.1% of anhydrous $N^4$-succinyl sulphathiazole was obtained. In the filtrate there was found unreacted or free sulphathiazole equivalent to 5.6% of the initial charge of sulphathiazole. This illustrates that in alcoholic solution, even with a large excess of succinic anhydride, the reaction does not go to completion. Removal of sulphathiazole from $N^4$-succinylsulphathiazole is a difficult procedure.

Inasmuch as the foregoing specification comprises preferred embodiments of the invention, it is to be understood that the invention is not limited thereto and that various modifications and alternatives may be adopted without departing from the invention, which is defined in the appended claims.

I claim:

1. The process of producing $N^4$-succinylsulphathiazole which comprises the reaction of succinic anhydride with sulphathiazole in the presence of acetone as a solvent.

2. The process of producing $N^4$-succinyl-$N^1$-2-sulphanilamido - 4,5,6,7 - tetrahydrobenzothiazole which comprises the reaction of succinic anhydride with 2-sulphanilamido-4,5,6,7-tetrahydrobenzothiazole in the presence of acetone as a solvent.

3. The process of producing N⁴-phthalylsulphathiazole which comprises the reaction of phthalic anhydride with sulphathiazole in the presence of acetone as a solvent.

4. The process of producing a 2-(N⁴-carboxyacylamino benzenesulphonamido) thiazole, which comprises the reaction at a temperature below approximately 60° C. of a dicarboxylic acid anhydride with a sulphathiazole in the presence of a ketone which is liquid at 30° C. as a reaction medium.

5. The process of producing a 2-(N⁴-carboxyacylamino benzenesulphonamido) thiazole, which comprises the reaction at a temperature below approximately 60° C. of a dicarboxylic acid anhydride selected from the group consisting of maleic, succinic and phthalic anhydrides with a sulphathiazole selected from the group consisting of sulphathiazole, 4-alkyl-sulphathiazoles and 2-sulphanilamido -4,5,6,7- tetrahydrobenzothiazole in the presence of a ketone selected from the group consisting of acetone and 2-butanone as a solvent.

FERDINAND B. ZIENTY.